United States Patent [19]

Stockdale

[11] 4,145,581

[45] Mar. 20, 1979

[54] AUTOMATIC TELEPHONE DIALER FOR USE IN INTRUSION DETECTION SYSTEMS

[75] Inventor: Roy Stockdale, Huntington, N.Y.

[73] Assignee: Napco Security Systems, Inc., Copiague, N.Y.

[21] Appl. No.: 894,758

[22] Filed: Apr. 10, 1978

[51] Int. Cl.² ...................... H04M 1/46; H04M 11/04
[52] U.S. Cl. .......................... 179/90 BB; 179/90 BD; 179/5 P; 179/6 D
[58] Field of Search ............. 179/90BB, 90 B, 90 BD, 179/90 CS, 90 K, 5 R, 5 P, 6 R, 6 D

[56] References Cited

U.S. PATENT DOCUMENTS

| | | | |
|---|---|---|---|
| 3,371,163 | 2/1968 | Moseley | 179/90 BD |
| 3,445,601 | 5/1969 | Whitely et al. | 179/6 D |
| 3,632,879 | 1/1972 | Freisinger | 179/5 P |
| 3,703,607 | 11/1972 | Cohen | 179/5 P |
| 3,790,721 | 2/1974 | Muhlbauer | 179/90 B |
| 4,032,722 | 6/1977 | Connolly et al. | 179/90 B |
| 4,079,200 | 3/1978 | Meri | 179/6 R |

*Primary Examiner*—Kathleen H. Claffy
*Assistant Examiner*—Gerald L. Brigance
*Attorney, Agent, or Firm*—Arthur L. Plevy

[57] ABSTRACT

An automatic telephone dialer is described which includes a dial tone detection circuit. The dial tone detection circuit responds to a series of tones which are prerecorded on a magnetic tape. The dial tone detection circuit operates to detect the tones and to provide a signal suitable to activate a dialing relay for tone bursts on the tape of a suitable predetermined duration. Upon receipt of a suitable duration tone burst, the tone detection circuit provides an accurate duration signal to provide a relatively identical delay at the beginning and end of a dialing pulse to thereby maintain an accurate dial mark/space ratio determined by the requirements of the telephone line which is accessed by the dialer.

10 Claims, 2 Drawing Figures

AUTOMATIC TELEPHONE DIALER FOR USE IN INTRUSION DETECTION SYSTEMS

BACKGROUND OF INVENTION

This invention relates to automatic telephone dialer equipment in general and more particularly describes a tone detection and dialing circuit for use in automatic telephone equipment.

Presently, there exists a large number of automatic telephone dialers which operate in conjunction with an intrusion detection system. Basically, the function of the dialer is to seize a telephone line upon receipt by the dialer of an intrusion signal from a monitored premises. The intrusion signal is produced by a series of sensors which are located about the premises such as fire or burglary detection devices. Upon activation of one of the sensors, a telephone dialer is engaged. The dialer operates to place a service request on a telephone line and upon seizure of the line, transmits a dialing code to a dialing register associated with the telephone network. The dialing code is indicative of the telephone number of either the fire department or a security location such as a police station. The format in the dialer enables the dialer to transmit to the access location an audible or digital message which essentially, gives the remote location a description of the type of intrusion as well as the particular address and location of the same. In this manner, the automatic dialer in conjunction with the intrusion systems enables the protected premises to be continuously monitored and to provide the adequate message to the proper location.

In any event, certain problems exist with many of the prior art dialers. A major difficulty involves the generation of dial pulses which are generated by the dialer to be transmitted over the telephone line. Because of the very close dialing (mark/space) ratio requirement of the telephone company, the dialing circuit needed should produce an identical delay at the beginning and end of each dial pulse. Coupled with this problem is the further problem of providing a delayed opening for the dialing relay. The reason for the delay is to enable the dialing relay to ignore transient tone bursts which can occur due to speech frequencies which are also recorded on a magnetic tape associated with the dialer. Therefore the dialing relay should not respond to tone durations shorter than the delay used in the pulse delay circuit.

It is therefore an object of the present invention to maintain a suitable delay in regard to the dialing mechanisms and to provide accurate ratio requirement in regard to dial pulses generated by the dialer in order to comply with telephone company standards.

BRIEF DESCRIPTION OF THE PREFERRED EMBODIMENT

In an automatic dialer of the type used to access a telephone line to transmit a prerecorded message via said line to a called location, said called location having a predetermined telephone number manifested by a series of predetermined tone signals of a specified frequency, which signals are stored on a tape associated with said dialer, which tape also contains said prerecorded message, the combination therewith of apparatus for responding to said tone signals to generate dial pulses of a sufficient duration of an on and off time to dial said number via said line to access said called location, comprising a controllable element positioned in series with said telephone line and controllable in a first position to close for engaging said line and in a second position to disengage said line, detection means responsive to said series of tone signals for providing a pulse output indicative of the format of the tone signals stored on said tape, a multivibrator having at least a first output and a clock input adapted to receive a pulse for changing the output condition of said multivibrator, said multivibrator operative in a first mode wherein said first output is high (SWITCH-ON) and operative in a second mode (SWITCH-OFF) wherein said first output is low, a data input associated with said multivibrator and operative to cause said output to assume a high or a low condition upon receipt of a clock pulse at said clock input, wherein said output will assume either said high or low condition according to the level impressed upon said data input as being high or low, means coupling said output of said detector means to said data input of said multivibrator, timing means having one input coupled to said data input of said multivibrator and a second input coupled to said output of said multivibrator, said timing means operative to provide a predetermined delayed signal at an output when said data input signal is different from said output signal of said multivibrator to provide a pulse at an output of said timing means, means coupling said output of said timing means to the clock input of said multivibrator for applying said pulse to said clock input of said multivibrator to cause said output of said multivibrator to assume the level present at said data input, and means coupling said output of said multivibrator to said controllable element to operate the same alternatively in said first and second positions according to said timing means and said tone bursts as detected to thereby provide said dialing pulses to said telephone line at a predetermined on and off ratio.

Figure 2:
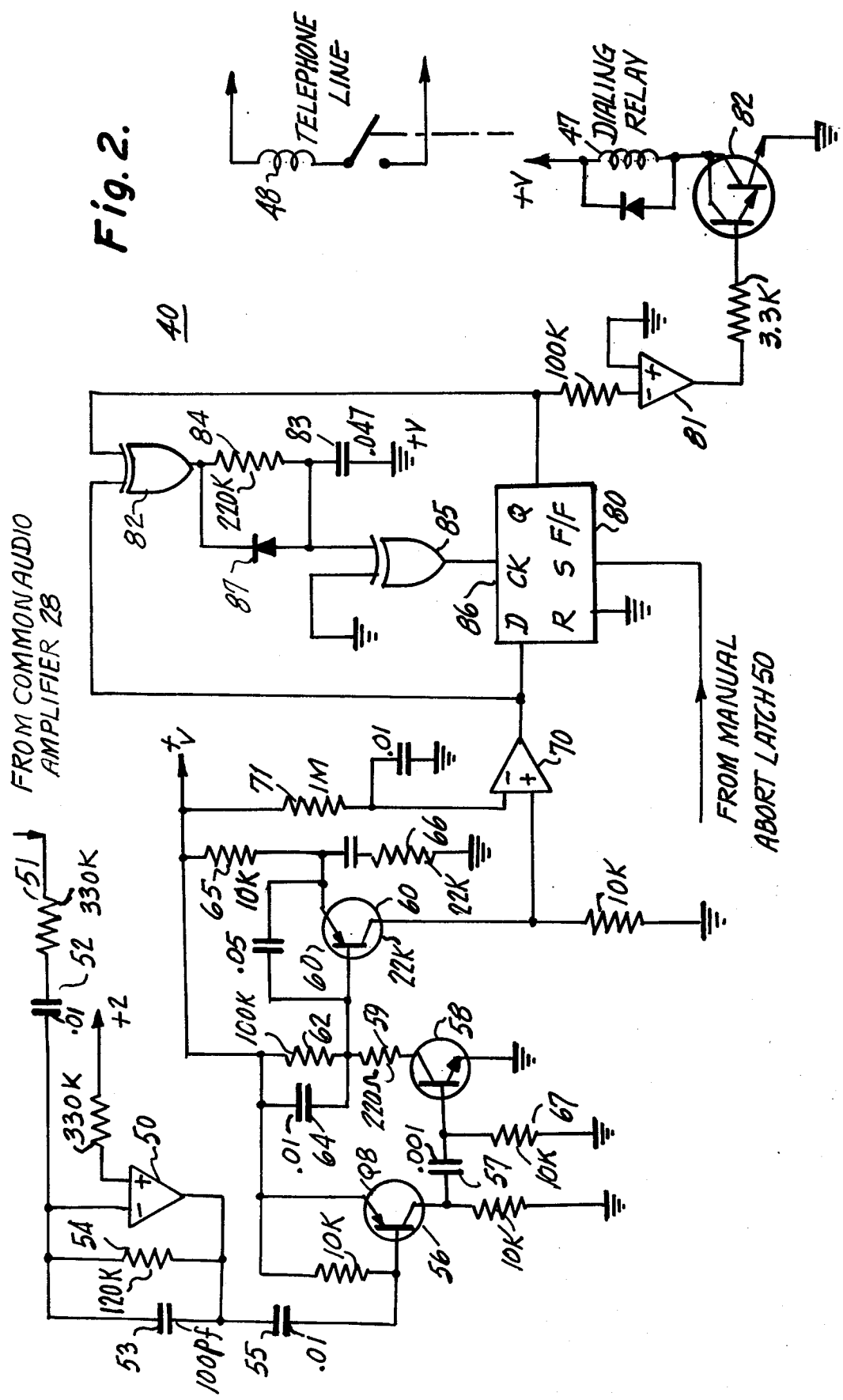
FIG. 2 is a schematic diagram of the dial tone detection circuit according to this invention.

It is noted that component values are indicated on FIG. 2 to depict the value of typical components together with reference numerals designating certain components described in the specification.

DETAILED DESCRIPTION OF THE INVENTION

Figure 1:
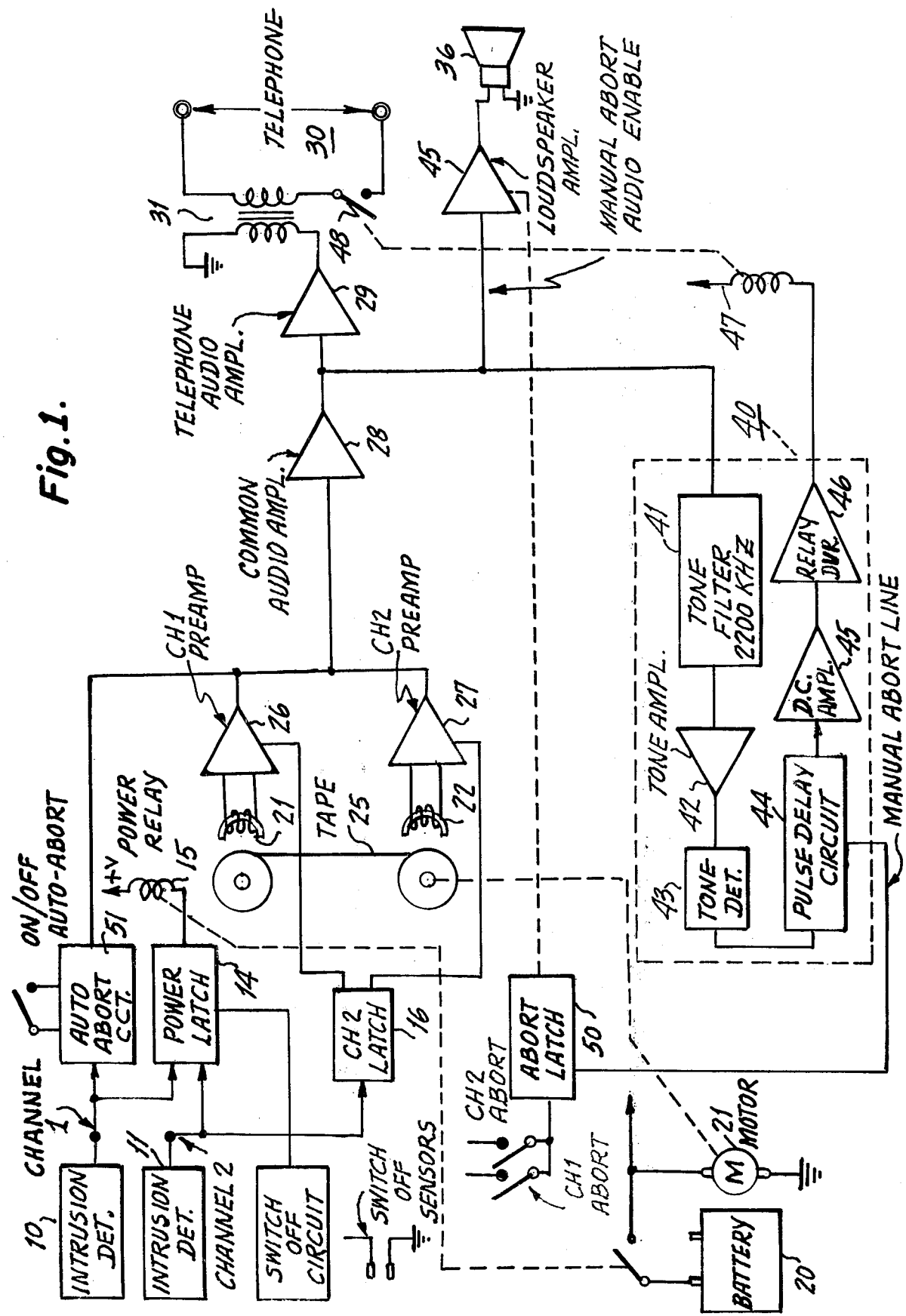
FIG. 1 is a simplified block diagram of a typical automatic telephone dialer employing a tone detection circuit according to this invention.

Referring to FIG. 1, there is shown a simplified block diagram of an automatic telephone dialer. Essentially, many of the components described are fully known and utilized in the prior art and are part and parcel of existing telephone dialers, but will be described in order to give one a clearer understanding of the nature of the particular problem solved and in the environment in which the telephone dialer operates.

There is shown a dual channel telephone dialer. A first channel has associated therewith a group of intrusion detection devices 10 which may be fire or burglary alarms and could comprise normally closed circuits, such as magnetic switches or other intrusion detection devices which are positioned about a premises to be monitored. Similarly, a second channel has another set of devices such as 11 associated therewith.

In a typical example, the devices 10 may be control units, or intrusion devices associated with a potential burglary or a break-in on a premises. Hence, channel 1 would monitor a burglary condition. On the other hand, channel 2 would be associated with, for example, a fire condition and the sensors 11 may therefore comprise smoke detectors, fire control units, temperature sensors and so on. Both the outputs from the intrusion detection devices 10 and 11 are coupled to the input of a power latch circuit 14. Essentially, the power latch circuit is an OR gate amplifier and operates to activate a power relay 15 upon receipt at the input of the power latch an intrusion detection signal.

In order to distinguish the nature of the signal, channel 2 is associated with its own latch circuit 16. Hence, upon receipt of an indication from channel 2, the latch circuit 16 which may be a suitable gate or amplifier, inactivates channel 1. Essentially, this is a priority type of condition and the dialer would function to give priority for example, to a fire condition over a burglary or break-in and hence, notify the fire department as a matter of priority.

The function of the power relay 15 when activated is to apply power from a battery or source 20 to the tape dialer to cause it to commence operation.

Associated with each channel is a magnetic head. There is a magnetic head 21 for channel 1 and a head 22 for channel 2. Each head is positioned in proximity with a prerecorded tape format impressed upon a magnetic tape 25. The magnetic tape 25 is conventionally driven by a motor 21 which is activated and energized by the power latch 14. Thus, upon receipt of an intrusion condition, the tape drive is activated and causes the tape to move in regard to the pickup heads 21 and 22.

The outputs of the amplifiers are coupled to the input of a common audio amplifier 28. The output of amplifier 28 is coupled to a telephone audio amplifier 29. The telephone amplifier 29 is coupled to a conventional pair of telephone lines 30 via an output transformer 31. The output transformer 31 serves to match the impedance of the telephone line in regard to the output impedance of the amplifier 29. The output of the common audio amplifier 28 is also coupled to an input of a loudspeaker amplifier 35. The output of amplifier 35 drives a loudspeaker 36 which enables one to listen to and thereby monitor the information impressed upon the magnetic tape 25.

Another output of the audio amplifier 28 is coupled to a tone detection circuit 40. The tone detection circuit is shown enclosed within dashed lines and constitutes the novel part of the telephone dialer, as will be described.

Essentially, once an intrusion has been detected, the tape has prerecorded thereon a first plurality of tone signals. These signals, as will be explained, are prerecorded at the frequency between 2,000 to 2,500Hz and are recorded according to the telephone numbers which the dialer is the access in the event of a fire or burglary condition. The tone bursts on the tape are prerecorded so that a channel 1 intrusion will cause the dialer to dial a predetermined number and transmit a particular audio message over the telephone lines to that number accessed. Similarly, an intrusion detection on channel 2 will cause the channel 2 head 22 to provide a completely different telephone number with a different recorded message by responding to information prerecorded on the alternate channel associated with the tape 25. The tone format recorded on the tape is applied via amplifier 28 to the tone detecting circuit 40. The tone detecting circuit includes a tone filter 41. The function of the tone filter is to filter the tone frequency from the tape signal and in essence, is a band pass filter which responds for example, to only the 2,000 to 2,500HZ signal associated with the tone bursts.

The tone filter is coupled to an amplifier 42 and to a tone detector 43. The function of the tone detector 43 is to produce a suitable DC signal upon the application of tone pulses thereto. As will be explained, the detector functions to detect the presence of the tone signal and to generate suitable duration signals according to the tone signal as prerecorded on the tape. The output of the tone detector is coupled to a pulse delay circuit 44. The function of the pulse delay circuit is to provide a delayed signal which is sufficient to drive the output relay and to maintain the desired mark/space ratio, as will be further described.

The output of the pulse delay circuit is applied to a DC amplifier 45 and thence, to a relay driver circuit 46. The circuit 46 activates a relay coil 47 which controls the contact 48 positioned in series with the telephone line.

There are other features shown in the block diagram such as an abort latch 50 and an automatic abort circuit 51. The functions of these circuits are to enable one to either manually or automatically stop the dialer from finishing its message by either removing power from the power relay or by inhibiting the transmission of a particular message. Abort features associated with such dialers are well known and are not considered part of this invention.

The dialer briefly operates as follows:

Upon receipt of an intrusion signal, the tape 25 is driven. As indicated, a particular series of tones are prerecorded on each channel. The first burst of tones is of a predetermined duration and is detected by detector 43 and if of a safe length, as will be explained, activates relay 47 via the driver 46 to close contact 48. The closing of contact 48 initiates a service request on the telephone line. As is normal, the closing of contact 48 causes the telephone equipment to transmit a dial tone. The closure time of relay contact 48 is a function of the length of the tone frequency recorded on the tape and is of a sufficient duration to insure the receipt of a dial tone. This service request signal is then followed by a series of tone bursts of the same frequency but indicative of the telephone number to be dialed. These bursts are again filtered and detected by the tone detection circuit 40 and cause the relay contact 40 to open and close in response to the tone format. This therefore provides dialing pulses to the telephone line. At the end of the tone signal indicative of the dialed number, the tone burst signal is followed by an audible message which is repeated and transmitted via the telephone audio amplifier 31 to the called location. In this manner, the called party receives the audible message and can take proper action according to the message to direct the necessary personnel and equipment to the premises monitored by the intrusion detection system associated with the automatic dialer above described.

Referring to FIG. 2, there is shown a schematic circuit diagram of the tone detection and dialing relay driver circuit 40 of FIG. 1. Essentially, the tone signal from the common audio amplifier 28 is applied to the input of an operational amplifier 50 via a series resistor and capacitor network 51 and 52.

The amplifier 50 is frequency corrected by a compensating capacitor 53 coupled between the negative input of amplifier 50 and the output. Basically, amplifier 50 is an operational amplifier; many examples of which are avaialble in integrated format. The amplifier 50 is responsive to the frequency of the tone signal by the proper selection of capacitors 52 and 53 in conjunction with resistors 51 and 54. Techniques of providing selective amplification by using operational amplifiers as 50 together with resistor capacitor networks are well known in the art.

The output of amplifier 50 is AC coupled via capacitor 55 to the base electrode of a PNP transistor 56. The transistor 56 is unbiased and will not conduct until the base voltage exceeds approximately 0.5 volts. Hence, transistor 56 is driven only by signals exceeding a certain magnitude. The collector electrode of transistor 56 provides a series of output pulses for signals applied to its base which exceed the 0.5 volts.

The collector electrode of transistor 56 is coupled to the base electrode of an NPN transistor 58 via a capacitor 57. Transistor 58 has its collector electrode coupled via a resistor 59 to the base electrode of a PNP transistor 60. Transistors 58 and 60 form a tone detector as will be explained.

Transistor 60 is biased to be normally nonconducting by means of a resistor 62 coupled to a source of positive potential and the voltage divider consisting of resistors 65 and 66 coupled between the source of the potential and the emitter electrode of transistor 60. The pulses generated at the collector electrode of transistor 58 must be of a sufficient magnitude to charge capacitor 64 to a voltage level in excess of the reverse bias applied to the base of transistor 60. When capacitor 64 is charged by the pulses, transistor 60 conducts.

Essentially, the capacitor 57 and resistor 67 which are coupled to the base of transistor 58 provide a high pass filter network which prevents low frequencies from being detected by transistor 60. Resistor 59 in conjunction with capacitor 64 provides a time constant at the base electrode of transistor 60 which prevents high frequencies or those frequencies above the pass band (above 2 to 2.5KHZ) from being detected. Any pulses produced by frequencies below the required pass band will be amplified by transistor 58 but will not alter transistor 60 to become saturated or conducting. This occurs because capacitor 64 discharges between successive pulses.

The output of transistor 60 will consist of a series of pulses. The output of transistor 60 is applied to the positive input of an operational amplifier 70. The negative input of the amplifier 70 is biased from the source of potential via resistor 71.

During a continuous tone burst at the proper frequency, the output of amplifier 70 remains at a high level for the duration of the tone pulse. The output of amplifier 70 is coupled to the D input of a D flip/flop 80. Hence, when output of amplifier 70 is high, the D input of flip/flp 80 is also high.

The Q output of flip/flop 80 is normally in a low condition. This forces the output of the operational amplifier 81 to be high. The output of amplifier 81 is coupled to the input of an amplifier 82. The common collector condition of amplifier 82 is coupled to the coil 47 of the dialing relay. Hence, when the Q output of flip/flop 80 is low, amplifier 82 causes the relay coil to be energized and contact 48 is closed. Alternatively, when the Q output of flip/flop 80 is high, the amplifier 82 is nonconducting and the relay contact 48 opens. Thus, when contact 48 is closed, the telephone line is engaged and the line becomes disengaged when the contact is open.

Coupled to the Q output of flip/flop 80 is one input of an exclusive OR gate 82. The other input of gate 82 is coupled to the D output of flip/flop 80 or the output of amplifier 70. Hence, when the data input or D input of flip/flop 80 is high, the exclusive OR gate 82 has unequal signals on its two input leads. This causes the output of gate 87 to go high. Capacitor 83 begins to charge through resistor 84 and if the pulse train is long enough, then capacitor 83 will charge to a level indicative of a high input. This then places a high value at the input of OR gate 85. The other input of OR gate 85 is coupled to a reference potential. As soon as capacitor 83 charges to a high level, the output of gate 85 goes high to produce a clock pulse at the clock input 86 of flip/flop 80. Thus, if the pulse train were not of a sufficient duration, capacitor 83 would not charge and diode 87 would discharge the capacitor 83 and thereby prevent a clock pulse from being generated at the output of gate 85.

Upon the receipt of a clock pulse at terminal 86, the Q output of flip/flop 80 goes high. As previously indicated, the D output of flip/flop 80 is also high. Since the Q output goes high, gate 82 will have two highs at its inputs and hence, the output goes low. This discharges capacitor 83 through the diode 87 and causes gate 85 to go low.

At the end of the pulse train, the D input of gate 82 is again low and the output of gate 82 goes high. This allows capacitor 83 to charge through resistor 84. When capacitor 83 is fully charged, the output of gate 85 again produces a clock pulse for the flip/flop 80. This causes the flip/flop to change the Q output to the same state as the data or D input, which are now both in the low condition. Hence, the exclusive OR gates 82 and 85 in conjunction with the timing circuit of resistor 84 and capacitor 83 provide a delayed switch on and switch off of flip/flop 80.

Also shown coupled to the set input of flip/flop 80 is an input from the manual abort latch circuit 50. This activation of the manual abort latch 50 will force the flip/flop in the set condition during an abort mode and hence, prevent dialing pulses from being generated.

As above indicated, if the signal duration of a tone is less than the delay time generated by resistor 84 and capacitor 83, the flip/flop 80 will not operate. This delay time is typically five to ten milliseconds and is sufficient to prevent transient tone pulses which may be produced by the recorded voice message from activating the relay 47.

The circuit thus described assures that the mark/space ratio of the dialing pulses is sixty-one percent break or open circuit plus or minus three percent. Due to the fact that the dialing pulses are generated under control of the flip/flop 80, the opening and closing delay of the dialing relay are virtually the same and hence, the dialing pulse train as provided by the relay 47 as activated via flip/flop 80 will always provide a proper mark/space ratio.

I claim:

1. In an automatic dialer of the type used to access a telephone line to transmit a prerecorded message via said line to a called location, said called location having a predetermined telephone number manifested by a series of predetermined tone signals of a specified frequency, which signals are stored on a tape associated with said dialer, which tape also contains said prerecorded message, the combination therewith of apparatus for responding to said tone signals to generate dial pulses of a sufficient duration of an on and off time to dial said number via said line to access said called location, comprising:

(a) a controllable element positioned in series with said telephone line and controllable in a first position to close for engaging said line and in a second position to disengage said line, (b) detection means responsive to said series of tone signals for providing a pulse output indicative of the format of the tone signals stored on said tape, (c) a multivibrator having at least a first output and a clock input adapted to receive a pulse for changing the output condition of said multivibrator, said multivibrator operative in a first mode wherein said first output is high (SWITCH-ON) and operative in a second mode (SWITCH-OFF) wherein said first output is low, a data input associated with said multivibrator and operative to cause said output to assume a high or a low condition upon receipt of a clock pulse at said clock input, wherein said output will assume either said high or low condition according to the level impressed upon said data input as being high or low, (d) means coupling said output of said detector means to said data input of said multivibrator, (e) timing means having one input coupled to said data input of said multivibrator and a second input coupled to said output of said multivibrator, said timing means operative to provide a predetermined delayed signal at an output when said data input signal is different from said output signal of said multivibrator, to provide a pulse at an output of said timing means, (f) means coupling said output of said timing means to the clock input of said multivibrator for applying said pulse to said clock input of said multivibrator to cause said output of said multivibrator to assume the level present at said data input, and (g) means coupling said output of said multivibrator to said controllable element to operate the same alternatively in said first and second positions according to said timing means and said tone bursts as detected to thereby provide said dialing pulses to said telephone line at a predetermined on and off ratio.

2. The combination of apparatus according to claim 1 wherein said controllable element comprises a relay having a coil operative to actuate a contact in a first position and in a second position.

3. The combination of apparatus according to claim 1 wherein said detector means includes a filter network having a bandpass centered about said specified frequency of said tone signals.

4. The combination of apparatus according to claim 3 wherein said specified frequency is between 2,000 to 2,500Hz.

5. The combination of apparatus according to claim 1 wherein said detector means includes a NPN transistor having a base, collector and emitter electrode, with the emitter electrode coupled to a point of reference potential, a PNP transistor having a base, collector, and emitter electrode means coupled to said PNP transistor for reverse biasing the same, means coupling the collector electrode of said NPN to the base electrode of said PNP, said means including a capacitor for charging to a level sufficient to bias said PNP transistor in a conducting state for tone signals of a predetermined duration.

6. The combination of apparatus according to claim 1 wherein said timing means includes an exclusive OR gate having one input coupled to said data input of said multivibrator and a second input coupled to said output of said multivibrator, an output coupled to an RC network selected to provide a predetermined time delay when said output of said gate is in a high condition due to the level of said inputs.

7. The combination of apparatus according to claim 1 wherein said means coupling said output of said multivibrator to said controllable element includes a DC amplifier having an input coupled to said multivibrator output and an output coupled to said controllable element.

8. The combination according to claim 1 wherein said multivibrator is a "D" type flip/flop.

9. The combination according to claim 1 wherein said on-off ratio is approximately sixty-one percent.

10. The combination according to claim 1 wherein said switch on and switch off times of said multivibrator as controlled are relatively equal.

* * * * *